Nov. 14, 1944.   R. WEDEBERG   2,362,953
OVERHEAD LUBRICATING SUPPLY APPARATUS
Filed July 28, 1943   2 Sheets-Sheet 1
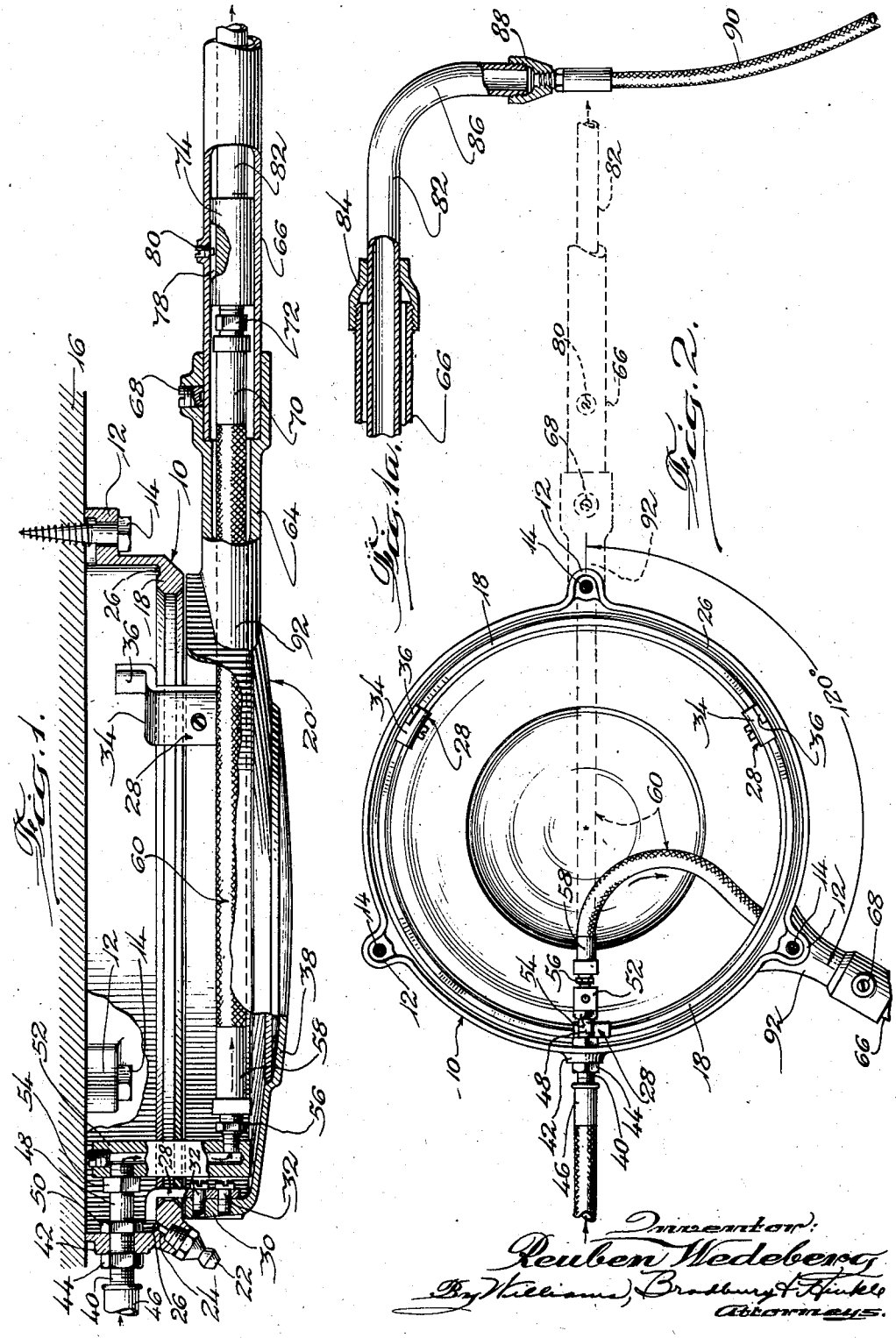

Nov. 14, 1944.  R. WEDEBERG  2,362,953
OVERHEAD LUBRICATING SUPPLY APPARATUS
Filed July 28, 1943  2 Sheets-Sheet 2
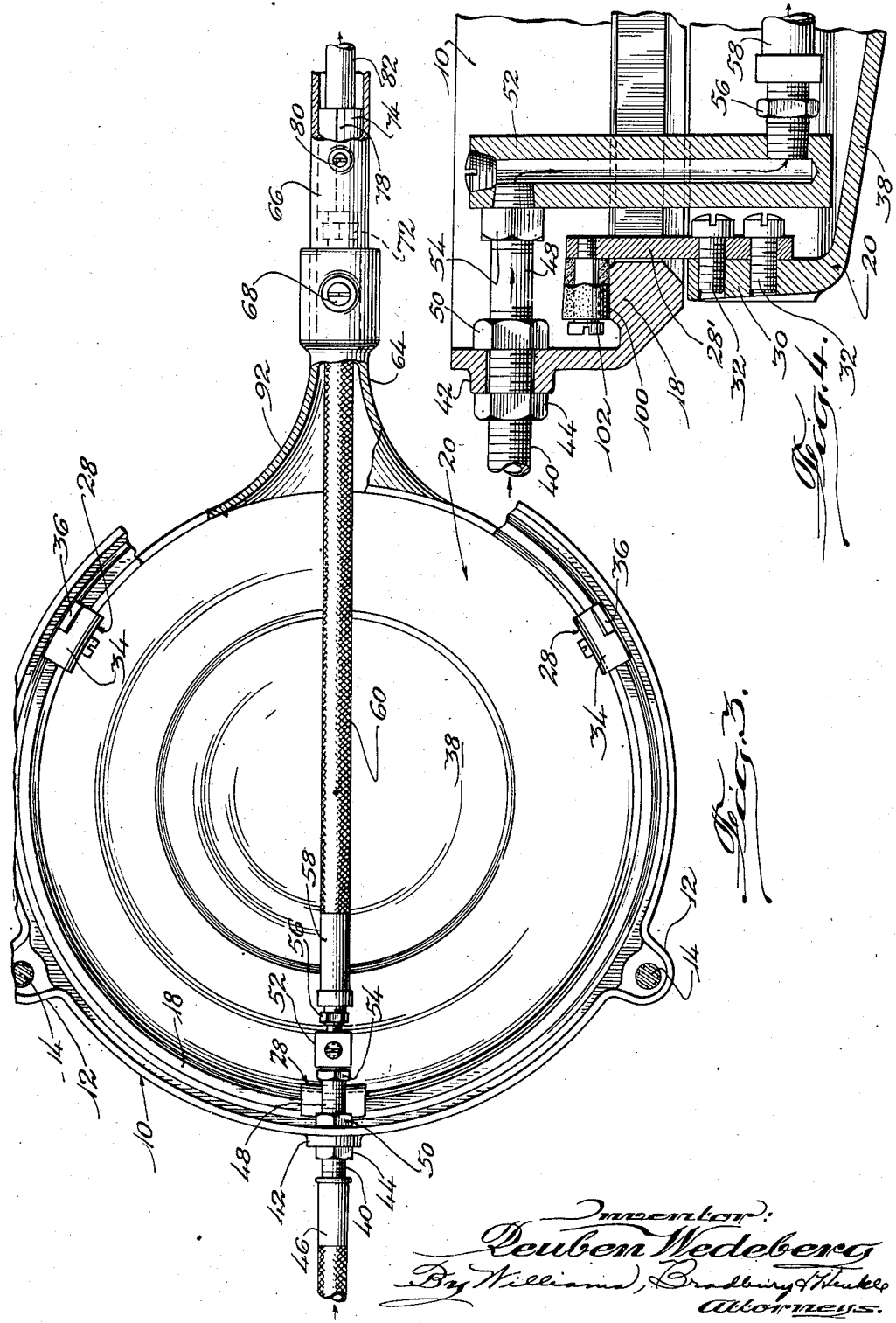

Patented Nov. 14, 1944

2,362,953

UNITED STATES PATENT OFFICE 2,362,953

OVERHEAD LUBRICATING SUPPLY APPARATUS

Reuben Wedeberg, Chicago, Ill., assignor to Stewart-Warner Corporation, Chicago, Ill., a corporation of Virginia Application July 28, 1943, Serial No. 496,398

11 Claims. (Cl. 285—9)

My invention relates to overhead lubricating supply apparatus of the kind particularly adapted for use in garages and automobile service stations.

It is common to provide a garage or service station with an overhead swivel mounted on the ceiling of a space adapted to receive a plurality of automobiles requiring lubrication. The swivel has a fixed member which is connected by a rigid pipe line to a power driven lubricant compressor placed in some convenient location in the garage or service station. The movable element of the swivel is connected to a flexible hose having a control valve provided with a nozzle for attachment to the fittings or nipples associated with the bearings of the automobile. In such prior installations it was common to make the swivel so that it could be rotated through a complete circle and to pack the joint between the relatively rotatable parts of the swivel to prevent leakage therebetween. This prior art apparatus is expensive and has the further disadvantage of leaking lubricant whenever the packing between the rotatable and stationary members becomes worn or damaged.

An object of my invention is to provide a new and improved overhead lubricating supply apparatus which is less expensive than the apparatus of the prior art.

Another object of my invention is to provide a new and improved overhead lubricating supply apparatus which requires no packing between the movable and stationary parts thereof.

Another object of my invention is to provide a new and improved overhead lubricating supply apparatus which may be easily installed and which will operate satisfactorily over long periods of time with minimum attention.

Other objects and advantages will become apparent as the description proceeds.

In the drawings:

Fig. 1 is a sectional view of a preferred embodiment of my invention showing my invention applied to the ceiling of a garage or service station;

Fig. 1a is a continuation of the right-hand end of Fig. 1;

Fig. 2 is a top plan view on a reduced scale of the apparatus shown in Fig. 1 and indicates the permissible degree of swiveling;

Fig. 3 is a full scale top plan view of part of the apparatus shown in Fig. 1; and Fig. 4 is a partial sectional view of a modified form of my invention.

The embodiment of Figs. 1, 1a, 2 and 3 comprises an annular base 10 having bosses 12 receiving screws 14 for attaching the base 10 to the ceiling 16 of a garage or service station. The base 10 has an annular track 18 for supporting a cover, indicated generally by reference numeral 20, and this track 18 is supplied with lubricant through a nipple or fitting 22 communicating by duct 24 with the annular groove 26 surrounding the track 18.

The cover 20 is provided with supporting straps 28 secured to the annular flange 30 of the cover 20 by screws 32 or in any other suitable manner. The upper portions 34 of the straps 28 are bent over as indicated in the drawings and rest upon the track 18 with which they slidably engage to permit rotation of the cover 20 with respect to the base 10. Two of the straps 28 are provided with upstanding fingers 36 for limiting swiveling movement of the cover 20 in a manner hereinafter described. The exposed portion of the cover 20 may have an offset portion 38 to increase the attractiveness of this cover and may be given any suitable finish to enhance its appearance.

A pipe nipple 40 is threaded into the tapped opening in a boss 42 provided by the base 10 and is firmly secured thereto by a lock nut 44. One end of a rigid lubricant supply pipe 46 is attached to the nipple 40 and the other end of this supply pipe is connected to a power operated lubricant compressor of any suitable design and located in any convenient place in the garage or service station. This lubricant compressor is usually provided with a presure operated cut-out whereby the compressor automatically maintains a predetermined pressure in the supply pipe 46.

A second nipple 48 is screwed into the boss 42 and locked thereto by a lock nut 50. The other end of the nipple 48 is threaded into the upper end of a tubular member 52 and locked thereto by a lock nut 54. The lower end of the tubular member 52 is adapted to receive one threaded end of a pipe nipple 56. The other end of this pipe nipple is screwed into a metal coupler 58 on one end of a section of flexible hose, indicated generally by reference character 60.

In the position of the parts shown in Figs. 1 and 3, the flexible hose extends diametrically across the cover 20, through a tubular extension 64 forming an integral part of this cover, and into a tube 66 attached to this extension by means of a screw 68. This end of the hose section 60 is provided with a second metal coupler 70 connected by a second pipe nipple 72 to a cylindrical block 74. The block 74 is slidable axially of the tube 66 and is provided with a longitudinal groove 78 receiving the end of a screw 80 which prevents rotation of the block 74 in the tube 66.

A rigid pipe 82 has one end screwed or otherwise secured into the block 74 and this block affords a passage connecting the interior of the pipe 82 with the conduit through the flexible hose 60. The pipe 82 is slidably guided in a reduced extension 84 attached to the end of the tube 66 and some distance beyond this extension 84. The pipe 82 is bent downwardly as indicated at 86. A coupling 88 is attached to the end of the pipe 86 and provides a means for attaching this pipe to a second flexible hose 90 which extends downwardly from the ceiling of the garage or service station preferably between adjacent stalls adapted to receive automobiles requiring lubrication. The lower end of the flexible hose 90 is commonly provided with a control valve terminating in a quick detachable nozzle for creating a sealed connection between the control valve and the lubricant receiving nipples or fittings attached to the bearings of the automobile. A stand or other support is usually provided for this control valve although, if desired, it may simply hang from the pipe 86.

When my new and improved apparatus is being used to lubricate an automobile, the lubricant compressor maintains flexible conduit 90 and all connections leading to this conduit filled with lubricant under the maximum pressure which the compressor is intended to provide. When the nozzle on the control valve attached to the discharge conduit 90 is applied to a lubricant receiving fitting and the control valve is opened, lubricant flows through pipe 46, nipples 40 and 48, tubular member 52, nipple 56, flexible conduit 60, nipple 72, block 74, pipe 82, and flexible conduit 90 into the bearing associated with this lubricant receiving fitting.

After this particular bearing has been adequately lubricated, the control valve is closed and the nozzle thereof is detached from that lubricant receiving fitting and applied to the lubricant receiving fitting on the next bearing to be lubricated. As the operator moves from bearing to bearing, the curved end of pipe 86 is moved to one side or the other of the central position indicated in the drawings. This causes the cover 20 to swivel about the base 10 in the appropriate direction and to the desired extent. In Fig. 2, the full line position shows one extreme movement of the cover 20. Swiveling movement of this cover is limited by engagement of one or the other of the upstanding ends 36 of the supporting straps 28 with the pipe nipple 48.

As the cover moves to one side of what I shall refer to as the normal position shown in Figs. 1 and 3, the effective length of the flexible conduit section 60 is reduced, thereby causing the block 74 and pipe 82 to slide to the left as viewed in Figs. 1 and 3. The tubular extension 64 is flared laterally in a smooth curve as indicated at 92 to prevent injury to the conduit 60. In the particular embodiment shown, I have illustrated my apparatus as providing a maximum swiveling movement of the cover through a total angle of approximately 240° or 120° to each side of the normal position. Any other swiveling movement within the range permitted by the flexible conduit 60, block 74 and pipe 82 may be provided by simply shifting the position of the straps having the upstanding fingers 36 and in some arrangements of these fingers it may be advisable to provide more than the three supporting straps shown.

In Fig. 4, I have shown a modified form of my invention wherein the cover 20 is supported by straps 28' having rollers 100 attached to the upper ends of these straps by screws 102. These rollers rest upon the track 18 and eliminate part of the friction present in the first form of my invention and occasioned by sliding the rigid portions 34 of the straps 28 on the track 18. In all other respects the modification of Fig. 4 may be identical with that of Figs. 1, 1a, 2 and 3 except that the lubricant 22 may be eliminated. The rollers may be impregnated with graphite or other lubricant to reduce friction between these rollers and the screws 102.

In my new and improved apparatus, the section of flexible conduit 60 conducts the lubricant from the stationary part to the swiveled part of the apparatus, so that it is unnecessary to provide a sealed joint between the base 10 and cover 20. The section of flexible conduit 60 may be identical in size, length and other details with similar sections used for other purposes and is relatively inexpensive. A considerable saving in expense is therefore effected by eliminating the sealed joint heretofore necessary between the stationary and movable parts of the swivel. I have found that where the base 10 is attached to the ceiling, midway both longitudinally and laterally of the space between adjacent stalls, a swiveling range of 240° is ample.

From the foregoing, it will be apparent that I have provided a new and improved overhead lubricating supply apparatus which can be inexpensively manufactured and installed, which is free from the leakage difficulties of the prior art, and which is capable of providing long and trouble-free service. While I have shown only two forms of my invention, it is susceptible of numerous other modifications and variations and includes all modifications, variations and equivalents coming within the appended claims.

I claim:

1. Overhead lubricating supply apparatus of the class described, comprising a base to be adapted to be attached to a ceiling of a garage or service station and having a fixed lubricant inlet adapted to be connected to a source of lubricant under pressure, a cover, means for mounting said cover for rotation on said base, a tubular part provided by said cover, a block slidably mounted in said tubular part, a flexible hose connecting said block with said inlet, and a discharge conduit connected to said block.

2. Overhead lubricating supply apparatus of the class described, comprising a base having a circular track and an inlet adapted to be connected to a source of lubricant under pressure, a swiveling member, means supporting said member from said track, a block movable in said swiveling member, a section of flexible hose connecting said block with said inlet, and a discharge conduit connected to said block.

3. Overhead lubricating supply apparatus of the class described, comprising a base adapted to be attached to a fixed support and having an inlet adapted to be connected to a source of lubricant under pressure, a cover depending from said base, means supporting said cover from said base for swiveling movement relative thereto, a lubricant conducting member rigidly attached to said inlet and extending downwardly into said cover, tubular means rigid with said cover, a block slidably mounted in said tubular means, a flexible conduit connecting said block with the lower end of said lubricant conducting member, a rigid pipe attached to said block and a flexible discharge conduit connected to said pipe.

4. Overhead lubricating supply apparatus of the class described, comprising a base providing a circular track and having a rigid inlet adapted to be connected to a source of lubricant under pressure, means for lubricating said track, a cover depending from said base, a plurality of straps attached to said cover and having parts resting on said track, said cover having a tubular extension rigid therewith, a tubular block mounted in said extension for sliding movement therein, means preventing rotation of said block relative to said extension, a flexible hose connecting said block and inlet, and a discharge conduit connected to said block.

5. Overhead lubricating supply apparatus of the class described, comprising a base having a circular track surrounded by a lubricant receiving groove, means for supplying lubricant to said groove, said base being provided with an inlet adapted to be attached to a source of lubricant under pressure, rigid conduit means attached to said inlet and depending therefrom, a cover for said base, means supporting said cover from said track and permitting swiveling movement of said cover relative to said base, said means being engageable with said inlet to limit swiveling movement of said cover, a flexible conduit having one end attached to said conduit means, means for slidably mounting the other end of said flexible conduit relative to said cover, and a discharge conduit connected to said last-named means.

6. Overhead lubricating supply apparatus of the class described comprising a base having a track and a fixed lubricant conduit adapted to be connected to a source of lubricant under pressure, means for attaching said base to a ceiling or other support, a swiveled member, means for supporting said member from said track, said member having a part for guiding a sliding block, a block slidably mounted in said guiding part, a flexible conduit connecting said member with said first-named conduit, said flexible conduit lying in a plane parallel to said ceiling, and a discharge conduit connected to said sliding part.

7. Overhead lubricating supply apparatus of the class described, comprising a base to be adapted to be attached to a ceiling of a garage or service station and having a fixed lubricant inlet adapted to be connected to a source of lubricant under pressure, a cover, means for mounting said cover for rotation on said base, a tubular part provided by said cover, a block slidably mounted in said tubular part, a flexible hose connecting said block with said inlet, a rigid discharge conduit connected to said block, and a guide attached to said tubular part and slidably receiving said last-named conduit.

8. Overhead lubricating supply apparatus of the class described, comprising a base having a circular track and an inlet adapted to be connected to a source of lubricant under pressure, a swiveling member, roller means supporting said member from said track, a block movable in said swiveling member, a section of flexible hose connecting said block with said inlet, and a discharge conduit connected to said block.

9. Overhead lubricating supply apparatus of the class described, comprising a base adapted to be attached to a fixed support and having an inlet adapted to be connected to a source of lubricant under pressure, a cover depending from said base, means supporting said cover from said base for swiveling movement relative thereto, a lubricant conducting member rigidly attached to said inlet and extending downwardly into said cover, tubular means rigid with said cover, a block slidably mounted in said tubular means, a flexible conduit connecting said block with the lower end of said lubricant conducting member, a rigid pipe attached to said block and having a downwardly curved end, and a flexible discharge conduit connected to said end.

10. Overhead lubricating supply apparatus of the class described, comprising a base providing a circular track and having a rigid inlet adapted to be connected to a source of lubricant under pressure, means for lubricating said track, a cup-shaped cover depending from said base, a plurality of straps attached to said cover and having parts resting on said track, said cover having a tubular extension rigid therewith and flaring thereinto along a smooth curve, a tubular block mounted in said extension for sliding movement therein, means preventing rotation of said block relative to said extension, a flexible hose connecting said block and inlet, and a discharge conduit connected to said block.

11. Overhead lubricating supply apparatus of the class described, comprising a base having a track and a fixed lubricant inlet adapted to be connected to a source of lubricant under pressure, means for attaching said base to a ceiling or other support, a swiveled member, means for supporting said member from said track, said member having a part for guiding a sliding block, a block slidably mounted in said guiding part, a flexible conduit connecting said member with said inlet, said guiding part presenting a curved surface for engaging said flexible conduit when said swiveled member is rotated, and a discharge conduit connected to said sliding part.

REUBEN WEDEBERG.